S. S. CHEWNING.
MEANS FOR REGULATING THE FEED OF SOLDER IN CAN SOLDERING MACHINES.
APPLICATION FILED JAN. 20, 1912.
1,022,770.
Patented Apr. 9, 1912.
2 SHEETS—SHEET 1.
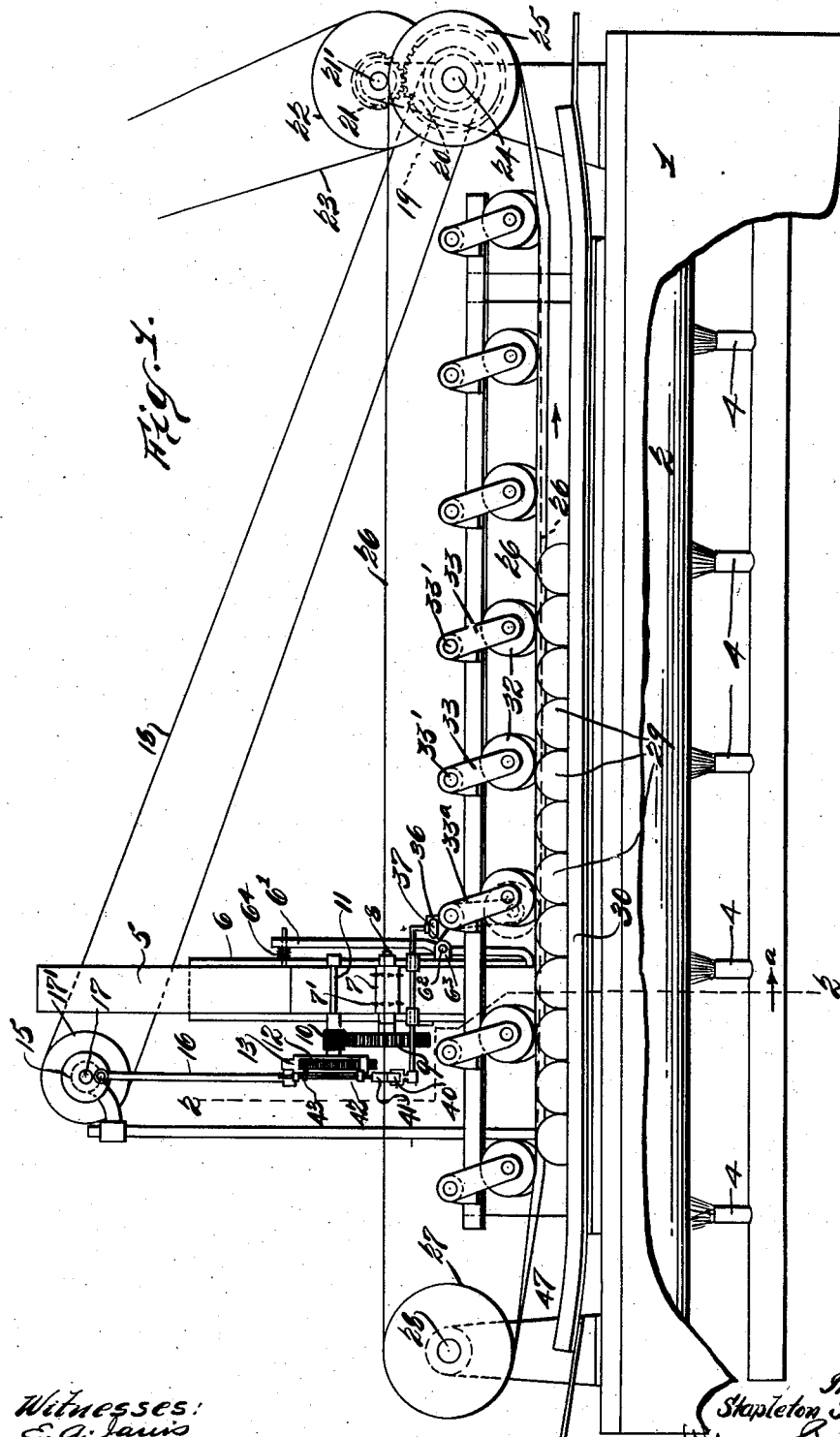
Witnesses:
Inventor:
Stapleton S. Chewning
attorney.

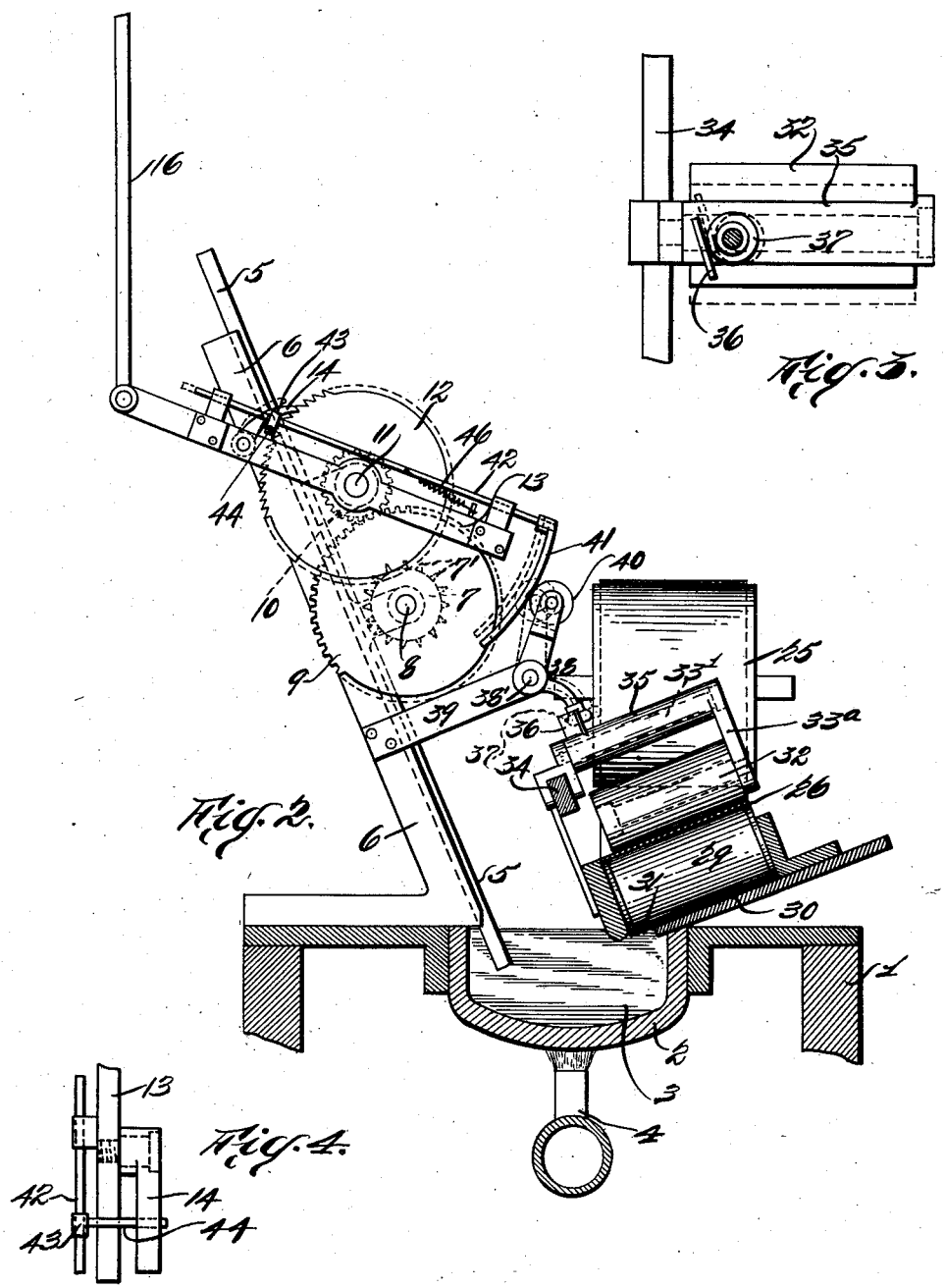

UNITED STATES PATENT OFFICE.

STAPLETON S. CHEWNING, OF NEW BERLIN, NEW YORK, ASSIGNOR TO BORDEN'S CONDENSED MILK COMPANY, OF NEW YORK, N. Y., A CORPORATION OF NEW JERSEY.

MEANS FOR REGULATING THE FEED OF SOLDER IN CAN-SOLDERING MACHINES.

1,022,770. Specification of Letters Patent. Patented Apr. 9, 1912.

Application filed January 20, 1912. Serial No. 672,311.

*To all whom it may concern:*

Be it known that I, STAPLETON S. CHEWNING, a citizen of the United States, and a resident of New Berlin, in the county of Chenango and State of New York, have invented certain new and useful Improvements in Means for Regulating the Feed of Solder in Can-Soldering Machines, of which the following is a specification.

My invention relates to improvements in can soldering machines in which pluralities of cans are, after application thereto of flux, normally continuously propelled in procession through the machine, while partially immersed in molten solder. Said solder is usually contained, and by suitable means maintained molten, in a longitudinal tank, adjacent to which is a runway for the cans, disposed so as to insure their partial immersion in the solder bath while being propelled through said runway by an endless belt or other equivalent means disposed to bear on the cans and thus rotate them through the tank and runway. The solder thus withdrawn by the cans is renewed constantly by feeding to the bath unmolten solder usually in the form of bars, and means are supplied operatively connected with a source of power to so feed the solder continuously during the operation of the machine. It often happens however that for some cause the supply of cans is interrupted temporarily, during which interruptions hitherto the said feed of the solder undesirably continues with the result sometimes that solder is wasted by its overflow from the tank, or the level of the molten solder in the tank is wastefully raised above that necessary for application to the cans of the least solder required for tight seaming. These conditions have therefore heretofore required attendance of an operator to watch the machine, and manually restrain the feed of the solder whenever propulsion of the cans through the tank is interrupted for any cause, as most frequently occurs from the supply of cans giving out temporarily thus producing absence of cans from the runway and tank.

The object of my invention is to provide means to automatically interrupt the feed of the unmolten solder to the tank as often as said interruptions occur in the progression of cans through the machine, thus dispensing with the services of said operator and insuring maintenance of a more constant, required, level of the molten solder, than can be expected from even skilled and vigilant attention to manually arresting the solder feed. I attain this object by the mechanism illustrated in accompanying drawings, in which—

Figure 1 is a front elevation of a can soldering machine embodying my said improvements; Fig. 2 is a cross-sectional view, on enlarged scale, of parts taken on the section line 2—2 of Fig. 1 and seen in the direction of the arrow *a;* Fig. 3 is a top plan view on still more enlarged scale of certain details hereinafter referred to; Fig. 4 is an enlarged fragmentary view of the pawl and pawl-lifting finger.

Similar reference numerals refer to similar parts throughout the several views.

The table 1 supports the usual tank 2 containing the solder 3, which is, as usual, melted and maintained in molten state by heat communicated from the burners 4. The bars of unmolten solder 5 are, as usual, movably supported in an inclined slide 6, said bars being yieldingly restrained from moving in said slide by the clamping lever 6' (see Fig. 1) vibratably supported on the pin $6^2$ carried by the ear $6^3$ carried by the slide 6. A spring $6^4$ is supported and disposed to force one arm of said lever from the slide and thus the opposite arm of the lever against the bar of solder whereby latter is yieldingly clamped and restrained from moving in the slide. A roller 7 provided with therefrom projecting spikes 7' is also, as usual, carried by a shaft 8 rotatably mounted in slide 6 and so disposed that said spikes engage with the solder bars and thus move the latter in the slide to the extent and in the direction in which said shaft and roller are rotated. The shaft 8 also carries the gear 9 which meshes with the pinion 10 carried by a shaft 11 also rotatably mounted on slide 6 as shown in Fig. 2. The shaft 11 also carries a ratchet wheel 12. A frame 13 is vibratably mounted on the shaft 11, as shown in Fig. 2, and this frame 13 carries a pawl 14, normally disposed to engage with, and impart rotation to, said ratchet wheel 12, at each alternate vibration of said frame. To impart such vibration to the frame 13 a rotatory disk 15 (see Fig. 1) is connected to frame 13 by a link 16, said disk 15 being carried by shaft 17, which carries a pulley 17' connected by belt 18 with the driving pulley 19 carried by shaft 24, which is rotated through gear 20 on said shaft intermeshing with gear 21 carried by the shaft 21' rotated by means of pulley 22 and belt 23 from a power shaft not shown. The shaft 24 carries also a belt wheel 25 which actuates a thereby-carried flexible can-propelling member, or belt, 26 movably supported at the opposite end of the machine on the idler belt wheel 27 mounted on the shaft 28.

For the cans 29, 29, a runway 30 is provided having an open portion 31, and disposed relatively to tank 2, so as to insure partial immersion of the cans in the molten solder as shown in Fig. 2. The cans are, normally, continuously being fed into said runway at the receiving end 47 of the machine. The can-propelling belt is so disposed that its under-run bears upon the cans in said runway, whereby the cans, while partially immersed in the solder, are rotated on their axes and propelled through the machine in the direction of propulsion of the therewith contacting portion of said belt, i. e. in the direction of the arrow shown in Fig. 1. Means are provided to insure sufficient bearing by said belt upon the cans. Such means are tensioning members, represented, in this instance, by usual idler rollers 32, disposed to constantly yieldingly force said can-propelling means, in this instance said belt 26, toward said runway, and thus cause it to bear more heavily than it would otherwise upon the cans. The tensioning members, rollers 32, are rotatably mounted in arms 33, rotatably journaled on shafts 33', carried by the stationary rail 34. The hub 35 of one of the arms 33, in this instance the one designated 33$^a$, located proximately to the slide 6 as seen in Fig. 1, I provide with a thereby carried angularly positioned cam 36. It will be noted that the construction is such that in absence of cans from the runway the said tensioning members are pulled down by gravity to the extent permitted by the length of the arms 33 as shown by dotted lines in Fig. 1, since the yielding belt 26, when unsupported by the cans, presents little or no resistance to such downward swing or vibration of said tensioning members and arms. On the other hand since care is taken that the diameters of the cans soldered be greater than the distance between said rollers and the floor of the runway, when cans enter the runway the belt is thereby correspondingly lifted which causes said rollers and the said arms suspending them to vibrate or swing in the direction of propulsion of the cans, and remain in inclined positions as shown by full lines in Fig. 1, so long as cans are in the runway.

In the path traveled by the angularly positioned cam 36, when the hub 35 of the arm 33$^a$ is rotated by latter's said vibration back to the position in which its thereby suspended roller has attained its limit of downward movement, or swing, caused by absence of cans in the runway as aforesaid, I dispose one arm, carying a roller 37, of a bell-crank lever 38, journaled upon a shaft 38', carried by a bracket 39, carried by the slide 6. The opposite arm of the bell-crank lever 38 carries another roller 40 disposed to contact with a shoe 41 presenting preferably a convex bearing toward said roller. The shoe 41 is carried by, and constitutes part of, a bar 42 which is slidably mounted in and carried by the aforesaid vibratable frame 13. The bar 42 carries, constituting part thereof, a lift-pin 44 secured thereto by a depending bracket 43. Said pin is disposed so as to lift and maintain the pawl 14 out of reach of the ratchet wheel 12 when the bar 42 is caused to slide sufficiently toward said pawl by pressure on its said shoe 41 of the roller 40 constituting part of the said bell-crank lever 38. Connected to said bar 42 and to said frame 13 I provide a retractile spring 46 disposed to normally tension said bar against said roller 40, whereby the pin 44 is withheld from contacting against the pawl 14 while cans are present in the runway.

From the foregoing it follows that while cans are in the runway the usual rate of feed of the solder as determined and adjusted by the requirements of the cans will be maintained so as to supply the amount of fresh solder required to make up for that carried away by the cans, but whenever there occurs absence of cans in the runway the flexible can-propelling member or belt will sag, thus permitting the tensioning member 33$^a$ to vibrate back to its normal least deflected position. Such vibration causes the cam carried by said tensioning member to bear against the thereto opposed arm of the bell-crank lever, the opposite arm of which is thereby caused to impel the bar 42 toward its abnormal position in which its thereby carried pin 44 lifts the pawl 14 out of reach of the ratchet wheel 12, thereby interrupting the feed of the solder. This interruption is maintained until other cans enter the runway causing the tensioning member 33$^a$ to vibrate back to its inclined position which enables the spring 46 to retract the bar 42, thus releasing the pawl 14 to resume its actuation of the ratchet wheel 12 at each vibration of the frame 13, thereby resuming the feed of the solder until another absence of cans in the runway occurs.

It will be understood that I do not claim, by themselves, as a part of my invention, the before described usual instrumentalities for applying the solder to the cans, but only these in combination with my aforesaid novel means for automatically regulating the feed of such solder. It will also be understood that I do not confine myself to the specific form, dimensions or locations as shown in the drawings of my instrumentalities for interrupting the feed of the solder as aforesaid, one of the broader aspects of my invention being the interposition between the usual solder feeding devices and such tensioning members, or their equivalents, as are shown, of mechanical means impelled by said tensioning members and disposed and adapted to interrupt the operation of such solder feeding members whenever cans are absent from the runway.

What I claim as new and desire to secure by Letters Patent is the following, viz:—

1. In a can-soldering machine a tank, means to movably support unmolten solder adjacent said tank, means to feed said unmolten solder into said tank, means to melt, and maintain molten, said solder in said tank, adjacent said tank a runway for the cans disposed to insure their partial immersion in said molten solder, a movable flexible member disposed to bear on said cans in said runway, means to continuously propel said member relatively to said runway, movably supported on a stationary part a tensioning member disposed to yieldingly force said flexible member toward said runway, and, impelled by said tensioning member during absence of cans from said runway, means to interrupt the operation of said solder-feeding means.

2. In a can-soldering machine a tank, means to movably support unmolten solder adjacent said tank, means to feed said unmolten solder into said tank, means to melt and maintain molten said solder in said tank, adjacent said tank a runway for the cans disposed to insure their partial immersion in said molten solder, an endless belt disposed to bear on said cans in said runway, means to continuously propel said belt relatively to said runway, movably supported on a stationary part a tensioning member disposed to yieldingly force said belt toward said runway, and, impelled by said tensioning member during absence of cans from said runway, means to interrupt the operation of said solder-feeding means.

3. In a can-soldering machine a tank, means to feed solder into said tank, means to maintain said solder in molten state in said tank, adjacent said tank a runway for the cans disposed to insure their partial immersion in said molten solder, means to propel said cans through said runway, movably supported on a stationary part a tensioning member disposed to yieldingly force said can-propelling means upward said runway, on said tensioning member a cam, vibratably supported on a stationary part a bell-crank lever one arm of which projects in the path of said cam and means impelled by the other arm of said lever to interrupt operation of said solder-feeding means during absence of cans from said runway.

4. In a can-soldering machine a tank, means to maintain solder in molten state in said tank, means to movably support unmolten solder adjacent to said tank, means, comprising a ratchet wheel, to feed said unmolten solder toward said tank, journaled on a stationary part a rockable frame, means to rock said frame, carried by said frame movably relatively thereto a pawl normally disposed to turn said ratchet wheel, means to propel said cans through said runway, a tensioning member disposed to yieldingly force said propelling means toward said runway, and means impelled by said tensioning member to move and maintain said pawl out of reach of said ratchet wheel when cans are absent from said runway.

5. In a can-soldering machine a tank, means to maintain solder in molten state in said tank, means to movably support unmolten solder adjacent to said tank, means, comprising a ratchet wheel, to feed said unmolten solder toward said tank, journaled on a stationary part a rockable frame, means to rock said frame, carried by said frame movably relatively thereto a pawl normally disposed to turn said ratchet wheel, slidably mounted on said frame a bar carrying a pin disposed to lift and maintain said pawl out of reach of said ratchet wheel, means to normally maintain said pin out of reach of said pawl, on one end of said bar a shoe, means to propel said cans through said runway, a tensioning member disposed to yieldingly force said propelling means toward said runway, on said tensioning member a cam, journaled on a stationary part a bell-crank lever one of its arms projecting in the path of said cam and the other bearing against said shoe.

6. In a can-soldering machine a tank, means normally operating to feed unmolten solder into said tank, means to melt and maintain molten said solder in said tank, a runway for the cans adjacent said tank disposed to insure partial immersion of said cans in said molten solder, means to propel said cans through said runway, means to tension said propelling means against said cans, and means actuated by said tensioning means to interrupt said feed of said solder during absence of cans in said runway.

STAPLETON S. CHEWNING.

Witnesses:
ETHEL VAN DEUSEN,
CLARA L. MATTESON.

Copies of this patent may be obtained for five cents each, by addressing the "Commissioner of Patents, Washington, D. C."